United States Patent
Schneider

(10) Patent No.: US 10,152,821 B2
(45) Date of Patent: Dec. 11, 2018

(54) SEGMENTED VOLUME RENDERING WITH COLOR BLEEDING PREVENTION

(71) Applicant: Robert Schneider, Roßtal (DE)

(72) Inventor: Robert Schneider, Roßtal (DE)

(73) Assignee: Siemens Healthcare GmbH, Erlangen (DE)

( * ) Notice: Subject to any disclaimer, the term of this patent is extended or adjusted under 35 U.S.C. 154(b) by 112 days.

(21) Appl. No.: 15/242,182

(22) Filed: Aug. 19, 2016

(65) Prior Publication Data

US 2018/0053334 A1    Feb. 22, 2018

(51) Int. Cl.
    *G06T 15/08* (2011.01)
    *G06T 7/11* (2017.01)

(52) U.S. Cl.
    CPC .............. *G06T 15/08* (2013.01); *G06T 7/11* (2017.01); *G06T 2200/04* (2013.01); *G06T 2210/41* (2013.01); *G06T 2219/2012* (2013.01)

(58) Field of Classification Search
    CPC ............. G06T 15/08; G06T 2219/2012; G06T 2210/41
    See application file for complete search history.

(56) References Cited

U.S. PATENT DOCUMENTS

| | | | | |
|---|---|---|---|---|
| 5,920,659 A | * | 7/1999 | Iverson | G06T 3/40 345/50 |
| 6,031,581 A | | 2/2000 | Harrington | |
| 6,501,471 B1 | * | 12/2002 | Venkataraman | G06T 15/08 345/424 |

OTHER PUBLICATIONS

European Search Report for corresponding Application No. 17182939. 3-1502, dated Oct. 2, 2017.
Agus, Marco, et al. "Split-Voxel: A Simple Discontinuity-Preserving Voxel Representation for Volume Rendering." Volume Graphics. 2010.
Bethel, E. High performance, three-dimensional bilateral filtering. No. LBNL-1601E. Ernest Orlando Lawrence Berkeley National Laboratory, Berkeley, CA (US), 2008.
Feng, Xiaojun, and Jan P. Allebach. "Segmented image interpolation using edge direction and texture synthesis." Image Processing, 2008. ICIP 2008. 15th IEEE International Conference on. IEEE, 2008.

(Continued)

*Primary Examiner* — Tapas Mazumder
(74) *Attorney, Agent, or Firm* — Lempia Summerfield Katz LLC

(57) ABSTRACT

In order to prevent color bleeding, a method of volume rendering a three-dimensional (3D) dataset includes identifying, by a processor, a mask that defines a segmented volume within the 3D dataset. The processor identifies a position within the 3D dataset at or adjacent to a boundary defined by the mask, identifies a plurality of voxels within the 3D dataset that are adjacent to the identified position within the 3D dataset, and determine, for each voxel of the plurality of voxels, whether the respective voxel is inside or outside of the identified mask. The processor determines, for each voxel of the plurality of voxels, a weight for the respective voxel based on the determination of whether the respective voxel is inside or outside of the identified mask. The processor determines a voxel value for the identified position based on the determined weights and voxel values for the plurality of voxels, respectively.

21 Claims, 5 Drawing Sheets

(56) References Cited

OTHER PUBLICATIONS

Hamann, Bernd, Issac J. Trotts, and Gerald E. Farin. "On approximating contours of the piecewise trilinear interpolant using triangular rational quadratic bezier patches." IEEE Transactions on Visualization and Computer Graphics 3.3 (1997): 215-227.

Kadosh, Arie, Daniel Cohen-Or, and Roni Yagel. "Tricubic interpolation of discrete surfaces for binary volumes." IEEE Transactions on Visualization and Computer Graphics 9.4 (2003): 580-586.

Pal, Chandrajit, Amlan Chakrabarti, and Ranjan Ghosh. "A brief survey of recent edge-preserving smoothing algorithms on digital images." arXiv preprint arXiv:1503.07297 (2015).

Roettger, Stefan, et al. "Smart hardware-accelerated volume rendering." VisSym. vol. 3. 2003.

* cited by examiner

SEGMENTED VOLUME RENDERING WITH COLOR BLEEDING PREVENTION

FIELD

The present embodiments relate to segmented volume rendering with color bleeding prevention.

BACKGROUND

In medical imaging post-processing environments, direct volume rendering of three-dimensional (3D) datasets allows an analysis of previously scanned objects. Direct volume rendering describes a number of visualization algorithms that range from classical volume rendering with a simple local shading model up to photorealistic shading that closely mimics light physics and takes global illumination requirements into account.

These visualization algorithms include the solving of mathematical volume rendering equations where transfer functions (e.g., a volume transfer function) and volume data are used as inputs. The transfer function takes color and extinction densities as input parameters. The transfer function provides a segmentation of a volume dataset, such that only some regions of the volume dataset are visible, while other regions of the volume dataset are implicitly removed from visualization. The transfer function also allows a classification of the volume dataset, where voxel values are mapped to different color and transparency properties.

The transfer function is specified as a function of physical values, which provides that all voxels that have a same physical value have the same segmentation and classification properties. Since different types of tissue may have the same physical values, such different types of tissue may not be separated using the transfer function alone.

An approach to separate the different types of tissue is to use binary segmented volumes. Subsets of voxels are combined into a binary voxel mask, forming a binary segmented volume that has a corresponding transfer function that is independent from the volume transfer function. During volume rendering, all segmented volumes having a corresponding transfer function are taken into account. With such an approach, the segmentation of the volume dataset is no longer defined by the volume transfer function alone, but is defined by a combination of binary masks and transfer functions.

With volume rendering using binary segmented volumes, issues may arise at boundaries of a binary mask. Since the binary mask may be on a voxel size level, the boundary of such a mask may be blocky without a boundary smoothing mechanism. Also, trilinear or higher interpolation of voxel values near a mask boundary involves interpolation of voxels that belong to different segmentations, resulting in interpolated values that may have no physical meaning. This may result in color classifications that show a color that is outside the classification of the segmented tissue (e.g., color bleeding).

Color bleeding for segmented volumes may be avoided by converting a voxel representation of the volume into a representation where local blocks of voxels are transformed into a representation including a plane equation and two constant values. Each of the two constant values represents an average of the local voxel block for one side of the plane. The transformed representation of the dataset (e.g., a split voxel representation of the dataset) is then used during volume rendering. The local planes of the split voxel representation of the dataset are aligned with the binary volume boundary, such that when the transformed representation of the dataset is used during volume rendering, the resulting images no longer exhibit color bleeding since no interpolation is performed across the boundary mask plane.

SUMMARY

In order to reduce or prevent color bleeding, a method of volume rendering a three-dimensional (3D) dataset includes identifying, by a processor, a mask that defines a segmented volume within the 3D dataset. The processor identifies a position within the 3D dataset at or adjacent to a boundary defined by the mask, identifies a subset of voxels within the 3D dataset, and determines, for each voxel of the subset of voxels, whether the respective voxel is inside or outside of the identified mask. The processor determines, for each voxel of the subset of voxels, a weight for the respective voxel based on the determining of whether the respective voxel is inside or outside of the identified mask. The processor determines a voxel value for the identified position based on the determined weights and voxel values for the subset of voxels, respectively.

In a first aspect, a method of color bleeding reduction or prevention when volume rendering a 3D dataset is provided. The 3D dataset includes a plurality of voxels. The method includes identifying, by a processor, a mask that defines a segmented volume within the 3D dataset. The processor identifies a position within the 3D dataset at or adjacent to a boundary defined by the mask. The processor identifies a subset of voxels within the 3D dataset. The processor determines, for each voxel of the subset of voxels, whether the respective voxel is inside or outside of the identified mask. The processor determines, for each voxel of the subset of voxels, a weight for the respective voxel based on the determining of whether the respective voxel is inside or outside of the identified mask. The processor determines a voxel value for the identified position based on the determined weights and voxel values for the subset of voxels, respectively.

In a second aspect, a system for volume rendering a three-dimensional dataset includes a memory configured to store a 3D dataset. The 3D dataset includes a plurality of voxels. The system also includes a processor in communication with the memory. The processor is configured to identify a mask that defines a segmented volume within the 3D dataset. The processor is also configured to identify a position within the 3D dataset at or adjacent to a boundary defined by the mask. The processor is configured to identify a subset of voxels of the plurality of voxels within the 3D dataset. The processor is also configured to determine, for each voxel of the subset of voxels, whether the respective voxel is inside or outside of the identified mask. The weight for the respective voxel is zero when the respective voxel is outside of the identified mask. The processor is configured to determine, for each voxel of the subset of voxels, a weight for the respective voxel based on the determination of whether the respective voxel is inside or outside of the identified mask. The processor is also configured to determine a voxel value for the identified position based on the determined weights and voxel values for the subset of voxels, respectively. The processor is configured to generate an image based on the determined voxel value for the identified position.

In a third aspect, in a non-transitory computer-readable storage medium storing instructions executable by one or more processors to volume render a 3D dataset, the instructions include identifying, by the one or more processors, a mask that defines a segmented volume within the 3D dataset. The instructions also include identifying, by the one or more processors, a position within the 3D dataset at or adjacent to a boundary defined by the mask. The instructions also include identifying, by the one or more processors, a subset of voxels within the 3D dataset, and determining, for each voxel of the subset of voxels, by the one or more processors, whether the respective voxel is inside or outside of the identified mask. The instructions also include determining, for each voxel of the subset of voxels, by the one or more processors, a weight for the respective voxel based on the determining of whether the respective voxel is inside or outside of the identified mask, and determining, by the one or more processors, a voxel value for the identified position based on the determined weights and voxel values for the subset of voxels, respectively.

In a fourth aspect, a method for reducing or preventing color bleeding when volume rendering a 3D dataset is provided. The 3D dataset includes a plurality of voxels. The method includes identifying, by a processor, a mask that defines a segmented volume within the 3D dataset. The processor identifies a plurality of positions within the 3D dataset at or adjacent to a boundary defined by the mask. For each position of the plurality of positions, the method includes the processor identifying a first subset of voxels of the plurality of voxels within the 3D dataset. The first subset of voxels is adjacent to the identified position. For each position of the plurality of positions, the method also includes the processor identifying, for each voxel of the first subset of voxels, a second subset of voxels of the plurality of voxels within the 3D dataset. The second subset of voxels is adjacent to the respective voxel. For each position of the plurality of positions, the method includes the processor determining, for each voxel of the second subset of voxels, whether the respective voxel is inside or outside of the identified mask, and determining, for each voxel of the first subset of voxels, a first weight for the respective voxel based on the determining of whether the respective voxel is inside or outside of the identified mask. For each position of the plurality of positions, the method also includes the processor determining, for each voxel of the second subset of voxels, a second weight for the respective voxel based on the determining of whether the respective voxel is inside or outside of the identified mask. For each position of the plurality of positions, the method includes the processor determining, for each voxel of the first subset of voxels, an average voxel value for the group of adjacent voxels based on the determined weights and the voxel values for the subset of voxels, respectively. For each position of the plurality of positions, the method also includes the processor adjusting, for each voxel of the first subset of voxels, the voxel value to be equal to the determined average voxel value, and determining a voxel value for the identified position with a rational interpolation operator as a function of the determined first weights, the determined second weights, and the adjusted voxel values for the first subset of voxels.

DETAILED DESCRIPTION OF THE DRAWINGS

Figure 1:
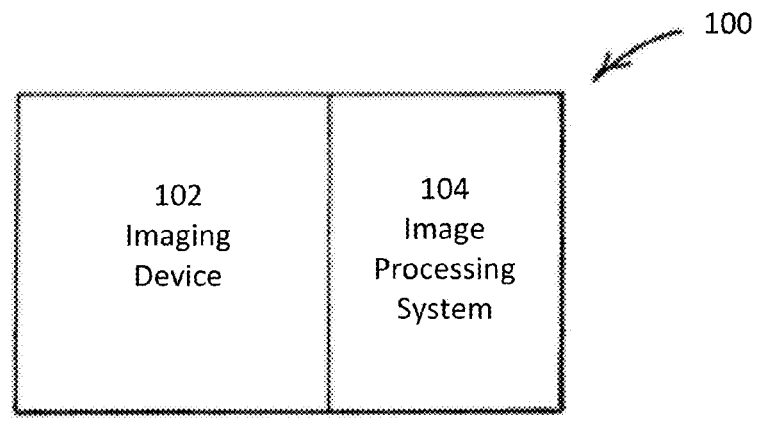
FIG. 1 shows one embodiment of an imaging system.

When performing volume rendering, integral equations may be solved along a ray (e.g., for ray casting) for each pixel of a resultant image. This involves sampling a volume a number of times along a ray. At each sample (e.g., at positions along the ray), a neighborhood of voxels adjacent to the sample are identified, and an interpolation operator is applied to obtain a continuous value from discrete voxel input data. When additional segmentation masks are available during rendering, some of the samples are at a boundary of the segmentation mask. At this boundary of the segmentation mask, a first portion of the neighborhood voxels are inside the segmentation mask, and a second portion of the neighborhood voxels are outside of the segmentation mask. Color bleeding may thus occur at the boundary of the segmentation mask.

The split voxel approach to avoid color bleeding requires preprocessing to create the split voxel representation of the dataset. This is time consuming, which may be problematic, for example, when binary masks are generated on the fly (e.g., when doing region growing). The split voxel approach also requires memory to store the split voxel representation of the dataset; the memory requirement may be high when a high quality approximation of the original dataset is to be provided. Additionally, voxel values near a feature plane are constants, so the voxel values are discontinuous. Such discontinuity becomes strongly visible when a 3D zoom of a segmentation boundary of the representation of the dataset is provided for a close-up image.

The present embodiments may be used to reduce or eliminate color bleeding in segmented volume renderings. More specifically, color bleeding is reduced or eliminated at segmented mask boundaries. Boundary interpolation operators that satisfy the convex hull property are provided to reduce or eliminate the color bleeding. The boundary interpolation operators do not require any preprocessing or storage and are well suited to be integrated into algorithms where binary masks are continually modified. The boundary interpolation operators may be combined with algorithms that solve boundary smoothing and preintegration problems at segmented mask boundaries.

In a first example, new interpolation operators may be provided (e.g., to use rational interpolation). Weights are applied during interpolation, and the weights depend on whether a voxel belongs to the segmentation mask or does not belong to the segmentation mask. The resulting interpolation operator determines, at a sampling position, an interpolated value from the voxel data of the volume.

In the first example, an interpolation scheme for a 3D segmented volume rendering may use a rational trilinear interpolation. Weights may be used as a degree of freedom at each voxel position, or the weights may be specified in a predetermined way. The interpolation scheme may be extended to produce a rational tricubic interpolation/approximation scheme. The interpolation scheme may also be extended to arbitrary rational polynomial cases. The interpolation scheme may be extended to four-dimensional (4D) segmented volumes. In other words, the interpolation scheme may prevent color bleeding at segmentation boundaries within a 4D movie with segmented masks.

When using uniform weights, the interpolation scheme of the first example results in a continuous interpolation operator that becomes a regular trilinear interpolation in non-boundary cases. Highly optimized code may be available for trilinear interpolation, or trilinear interpolation may be supported directly within used hardware.

The interpolation scheme of the first example is very fast compared to interpolation schemes of the prior art. The interpolation scheme of the first example also results in a continuous interpolation scheme. This interpolation scheme may be used for volume rendering scenarios in which high performance is to be provided, while color bleeding is prevented. An especially demanding volume rendering scenario is where volume rendering is to be physically based, and high quality global illumination is to be provided. The interpolation scheme of the first example may be integrated with such a physically based volume rendering without substantially increasing the rendering time. This makes it possible to add the color bleeding prevention to, for example, an interactive physically based volume renderer.

In a second example, the interpolation operator is not modified. Instead, the voxel input data that is used by the interpolation operators (e.g., for a trilinear interpolation) is modified. This is done by averaging the neighborhood of each voxel.

In the second example, an interpolation scheme for a 3D segmented volume rendering is based on continuation at mask boundaries. New voxel values are defined outside of the segmentation mask by an averaging operator. The averaging operator may use a 26 voxel neighborhood, though different sized neighborhoods may also be used. The averaging operator may be used with weights. The weights may be used as a degree of freedom at each voxel position, or the weights may be specified in a predetermined way. The averaging operator may also be applied inside the segmented volume. Once the averaging operator is applied, interpolation is performed using a trilinear interpolation scheme with the new voxel values as input. The interpolation scheme may be extended to four-dimensional (4D) segmented volumes.

The interpolation scheme of the second example may not be as fast as the interpolation scheme of the first example, since a larger number of voxels is used as input. This interpolation scheme, however, combines the color bleeding prevention with volume filtering. The interpolation scheme of the second example may thus be combined with algorithms that volume smooth on the fly (e.g., rendering of noisy volume data). The interpolation scheme of the second example is smoother than the interpolation scheme of the first example, since 26 neighborhood voxels influence an interpolation result. By using the 26 neighborhood voxels during the averaging, this interpolation scheme may very easily be extended to polynomial interpolations of higher degree than trilinear interpolation, thus providing higher order continuity between boundary and non-boundary interpolation cases.

In a third example, an interpolation scheme for a 3D segmented volume rendering is based on a combination of the first example and the second example above. The interpolation scheme of the first example and the interpolation scheme of the second example above are blended in a mathematically continuous way. The blending is based on a rational interpolation scheme that has a scalar blending parameter as input. The interpolation scheme may be extended to four-dimensional (4D) segmented volumes.

The interpolation scheme of the third example allows a range of boundary interpolation schemes controlled within a graphical user interface (GUI). For example, the GUI may include a slider controlled by a user to change the scalar blending parameter. The interpolation schemes of the first example and the second example, respectively, may be extreme positions of the slider. This allows the user to identify an optimal interpolation scheme for a segmented volume rendering. Such a fine-tuning of the boundary interpolation scheme may be advantageous for, for example, demanding high quality rendering.

The interpolation schemes of the present embodiments are well suited for dynamic scenarios (e.g., region growing) where binary masks are permanently modified. In one or more of the present embodiments, boundary surface computation is independent of the interpolation problem, so standard boundary surface algorithms may be used to achieve a continuous boundary. Thus, a 3D zoom near a segmentation boundary results in smooth, continuous, close-up images. The boundary surface computation for segmented volume rendering may be performed with a polynomial interpolation using binary mask information as input. The binary mask information for such surface computations may be reused by the interpolation schemes of one or more of the present embodiments. For example, the first example discussed above, which uses an eight voxel neighborhood, combined with a trilinear boundary surface computation, which uses the same eight voxel neighborhood, thus provides very fast color bleeding prevention of segmented volume rendering with good image quality.

FIG. 1 shows one embodiment of an imaging system 100. The imaging system 100 may be used in the system and method described below. The imaging system 100 may include one or more imaging devices 102 (e.g., an imaging device) and one or more image processing systems 104 (e.g., an image processing system). A dataset representing a two-dimensional (2D) or a three-dimensional (3D) (e.g., volumetric) region may be acquired using the imaging device 102 and the image processing system 104 (e.g., an imaging system). The 2D dataset or the 3D dataset may be obtained contemporaneously with the planning and/or execution of a medical treatment procedure or at an earlier time. Additional, different or fewer components may be provided.

In one embodiment, the imaging system 100 is, for example, a CT system. The imaging system 100 may be used to create a patient model that may be used for diagnostic purposes and/or in the planning of a medical treatment procedure. For example, the image processing system 104 is a workstation for treatment planning. In other embodiments, the imaging system 100 may include, for example, a medical workstation, a computed tomography (CT) system, an ultrasound system, a positron emission tomography (PET) system, an angiography system, a fluoroscopy, an x-ray system, any other now known or later developed imaging system, or a combination thereof. The workstation 104 receives data representing or images of the patient generated by the imaging device 102. The imaging system 100 may include more or fewer components.

Figure 2:
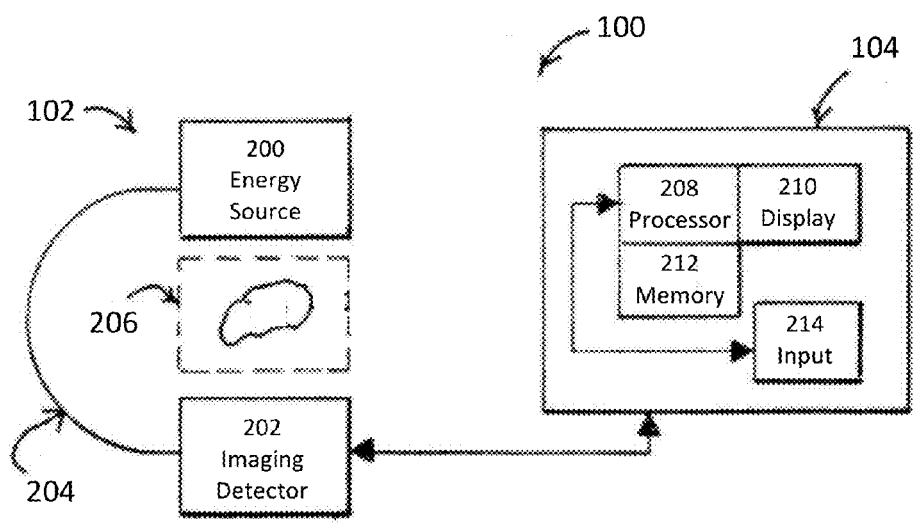
FIG. 2 shows an imaging system including one embodiment of an imaging device.

FIG. 2 shows the imaging system 100 including one embodiment of the imaging device 102. The imaging device 102 is shown in FIG. 2 as a C-arm X-ray device. The imaging device 102 may include an energy source 200 and an imaging detector 202 connected together by a C-arm 204. Additional, different, or fewer components may be provided. In other embodiments, the imaging device 102 may be, for example, a gantry-based CT device or an MRI device.

The energy source 200 and the imaging detector 202 may be disposed opposite each other. For example, the energy source 200 and the imaging detector 202 may be disposed on diametrically opposite ends of the C-arm 204. Arms of the C-arm 204 may be configured to be adjustable lengthwise, so that the energy source 200 and the imaging detector 202 may be positioned optimally in a ring structure. In certain embodiments, the C-arm 204 may be movably attached (e.g., pivotably attached) to a displaceable unit. The C-arm 204 may be moved on a buckling arm robot. The robot arm allows the energy source 200 and the imaging detector 202 to move on a defined path around the patient. During acquisition of non-contrast and contrast scans, for example, the C-arm 204 is swept around the patient. During the contrast scans, contrast agent may be injected intravenously. In another example, the energy source 200 and the imaging detector 202 are connected inside a gantry.

High rotation speeds may be attained with the C-arm X-ray device 102. In one embodiment, the C-arm X-ray device is operable to rotate up to 100°/s or 120°/s. In other embodiments, one complete scan (e.g., a 200 degree rotation) of the high speed C-arm X-ray device 102 may be conducted in less than 5 seconds, less than 3 seconds, less than 2 seconds, less than 1 second, less than 0.5 seconds, or less than 0.1 seconds.

The energy source 200 may be a radiation source such as, for example, an X-ray source. The energy source 200 may emit radiation to the imaging detector 202. The imaging detector 202 may be a radiation detector such as, for example, a digital-based X-ray detector or a film-based X-ray detector. The imaging detector 202 may detect the radiation emitted from the energy source 200. Data is generated based on the amount or strength of radiation detected. For example, the imaging detector 202 detects the strength of the radiation received at the imaging detector 202 and generates data based on the strength of the radiation. The data may be considered imaging data as the data is used to then generate an image. Image data may also include data for a displayed image.

During each rotation, the high speed C-arm X-ray device 102 may acquire between 50-500 projections, between 100-200 projections, or between 100-150 projections. In other embodiments, during each rotation, the C-arm X-ray device 102 may acquire between 50-100 projections per second, or between 50-75 projections per second. Any speed, number of projections, dose levels, or timing may be used.

A region 206 to be examined (e.g., the brain of a patient) is located between the energy source 200 and the imaging detector 202. The size of the region 206 to be examined may be defined by an amount, a shape, or an angle of radiation. The region 206 may be all or a portion of the patient. The region 206 may or may not include a surrounding area. For example, the region 206 to be examined may include the brain and/or other organs or body parts in the surrounding area of the brain.

The data may represent a two-dimensional (2D) or three-dimensional (3D) region, referred to herein as 2D data or 3D data. For example, the C-arm X-ray device 102 may be used to obtain 2D data or CT-like 3D data. A computer tomography (CT) device may obtain 2D data or 3D data. In another example, a fluoroscopy device may obtain 3D representation data. The data may be obtained from different directions. For example, the imaging device 102 may obtain data representing sagittal, coronal, or axial planes or distribution.

The imaging device 102 may be communicatively coupled to the image processing system 104. The imaging device 102 may be connected to the image processing system 104, for example, by a communication line, a cable, a wireless device, a communication circuit, and/or another communication device. For example, the imaging device 102 may communicate the data to the image processing system 104. In another example, the image processing system 104 may communicate an instruction such as, for example, a position or angulation instruction to the imaging device 102. All or a portion of the image processing system 104 may be disposed in the imaging device 102, in the same room or different rooms as the imaging device 102, or in the same facility or in different facilities.

All or a portion of the image processing system 104 may be disposed in one imaging device 102. The image processing system 104 may be disposed in the same room or facility as one imaging device 102. In one embodiment, the image processing system 104 and the one imaging device 102 may each be disposed in different rooms or facilities. The image processing system 104 may represent a plurality of image processing systems associated with more than one imaging device 102.

In the embodiment shown in FIG. 2, the image processing system 104 includes a processor 208, a display 210 (e.g., a monitor), and a memory 212. Additional, different, or fewer components may be provided. For example, the image processing system 104 may include an input device 214, a printer, and/or a network communications interface.

The processor 208 is a general processor, a digital signal processor, an application specific integrated circuit, a field programmable gate array, an analog circuit, a digital circuit, an accelerated processing unit (APU), a graphics processing unit (GPU), a Manycore processor, another now known or later developed processor, or combinations thereof. The processor 208 may be a single device or a combination of devices such as, for example, associated with a network or distributed processing. Any of various processing strategies such as, for example, multi-processing, multi-tasking, and/or parallel processing may be used. The processor 208 is responsive to instructions stored as part of software, hardware, integrated circuits, firmware, microcode or the like.

The processor 208 may generate an image from the data. The processor 208 processes the data from the imaging device 102 and generates an image based on the data. For example, the processor 208 may generate one or more angiographic images, fluoroscopic images, top-view images, in-plane images, orthogonal images, side-view images, 2D images, 3D representations (e.g., renderings or volumes), progression images, multi-planar reconstruction images, projection images, or other images from the data. In another example, a plurality of images may be generated from data detected from a plurality of different positions or angles of the imaging device 102 and/or from a plurality of imaging devices 102.

The processor 208 may generate a 2D image from the data. The 2D image may be a planar slice of the region 206 to be examined. For example, the C-arm X-ray device 102 may be used to detect data that may be used to generate a sagittal image, a coronal image, and an axial image. The sagittal image is a side-view image of the region 206 to be examined. The coronal image is a front-view image of the region 206 to be examined. The axial image is a top-view image of the region 206 to be examined.

The processor 208 may generate a 3D representation from the data. The 3D representation illustrates the region 206 to be examined. The 3D representation may be generated from a reconstructed volume (e.g., by combining 2D images) obtained by the imaging device 102 from a given viewing direction. For example, a 3D representation may be generated by analyzing and combining data representing different planes through the patient, such as a stack of sagittal planes, coronal planes, and/or axial planes. Additional, different, or fewer images may be used to generate the 3D representation.

Generating the 3D representation is not limited to combining 2D images. For example, any now known or later developed method may be used to generate the 3D representation.

The processor 208 may be a direct volume renderer that generates 2D projections from the reconstructed volume. The processor 208 takes color and opacity into account with a transfer function when generating the 2D projections from the reconstructed volume. Values of the reconstructed volume are converted into respective RGBA values, and the RGBA values are projected on corresponding pixels. The RGBA values may be projected on the corresponding pixels in any number of ways including, for example, volume ray casting, splatting, shear warp, and/or texture-based volume rendering.

The processor 208 may display the generated images on the monitor 210. For example, the processor 208 may generate the 3D representation and communicate the 3D representation to the monitor 210. The processor 208 and the monitor 210 may be connected by a cable, a circuit, another communication coupling or a combination thereof. The monitor 210 is a monitor, a CRT, an LCD, a plasma screen, a flat panel, a projector or another now known or later developed display device. The monitor 210 is operable to generate images for a two-dimensional view or a rendered three-dimensional representation. For example, a two-dimensional image representing a three-dimensional volume through rendering is displayed.

The processor 208 may communicate with the memory 212. The processor 208 and the memory 212 may be connected by a cable, a circuit, a wireless connection, another communication coupling, or a combination thereof. Images, data, and other information may be communicated from the processor 208 to the memory 212 for storage, and/or the images, the data, and the other information may be communicated from the memory 212 to the processor 208 for processing. For example, the processor 208 may communicate the generated images, image data, or other information to the memory 212 for storage.

The memory 212 is a computer readable storage media (e.g., non-transitory computer-readable storage media). The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 212 may be a single device or a combination of devices. The memory 212 may be adjacent to, part of, networked with and/or remote from the processor 208.

Figure 3:
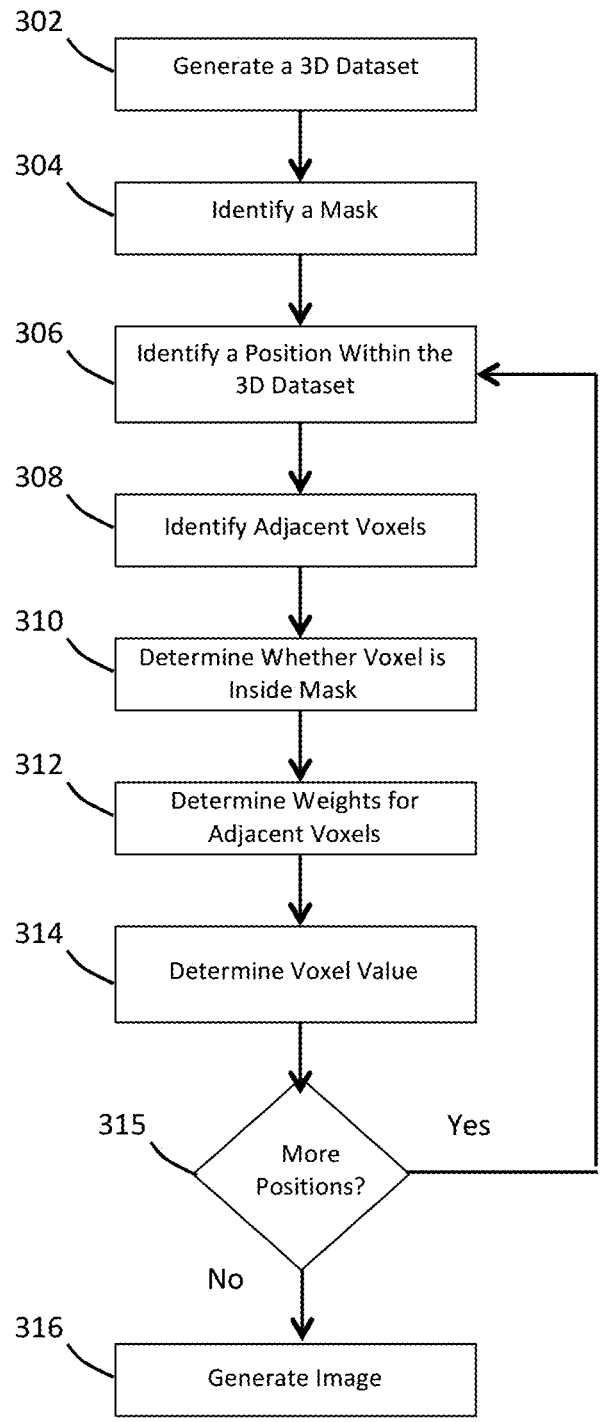
FIG. 3 shows a flowchart of an example of a method of volume rendering a three-dimensional (3D) dataset.

FIG. 3 shows a flowchart of one embodiment of a method 300 for volume rendering a 3D dataset. The method 300 includes color bleeding reduction or prevention. The 3D dataset may, for example, be CT image data or image data generated during rotation of a C-arm during X-ray imaging. Alternatively, the 3D dataset may be generated with another imaging device such as, for example, an MRI device. The method may be performed using the imaging system 100 shown in FIGS. 1 and 2 (e.g., at least some of the acts of the method may be performed by the processor 208) or another imaging system. For example, the acts of the method are implemented by one or more processors using instructions from one or more memories. The method is implemented in the order shown, but other orders may be used. Additional, different, or fewer acts may be provided. Similar methods may be used for artifact removal within image data.

In act 302, a 3D dataset is generated with an imaging system. The imaging system may be the imaging system 100 of FIGS. 1 and 2 or another imaging system. In one embodiment, the imaging system includes an X-ray device that generates a plurality of projections. The X-ray device may be a C-arm X-ray device, and the angular range may be an angular range of a C-arm of the C-arm X-ray device. The angular range may, for example, be 200° in a forward rotation of the C-arm X-ray device. The C-arm X-ray device may rotate at high speeds (e.g., 100°/s). In one embodiment, the C-arm X-ray device generates the plurality of projections over a plurality of angular ranges. For example, the C-arm X-ray device may generate the plurality of projections over a forward angular range of 200° and/or may generate a plurality of projections over a backward angular range of 200°. The plurality of projections may be stored in a memory in communication with the processor.

The processor generates the 3D dataset based on the plurality of projections. The processor may reconstruct the 3D dataset using a Feldkamp algorithm, for example. Other reconstruction algorithms may be used. The processor may apply a filter to preserve edges around high contrast regions within the 3D dataset. In one embodiment, no filtering is provided.

The result of the reconstruction with or without filtering is a volumetric data set representing X-ray attenuation values associated with a plurality of individual small volumes (e.g., voxels) of the object that has been imaged (e.g., the volume that has been imaged). The voxels represent an N×M×O region of the object, where N, M, and O are all greater than or equal to 1 in a rectangular grid. Other grids may be used. The first 3D dataset may be stored in the memory once the 3D dataset is generated by the processor. In act 302, instead of generating the 3D dataset, the processor may identify an already reconstructed 3D dataset stored in the memory.

In act 304, a processor identifies a mask that defines a segmented volume within the 3D dataset. The mask may be a binary segmentation mask that corresponds to the 3D dataset generated in act 302. The binary segmentation mask is a structure that assigns a Boolean value to each voxel of the 3D dataset generated in act 302. The binary segmentation mask also has an attached transfer function that assigns color and opacity values to the voxels of the 3D dataset where the binary value of the binary segmentation mask is "true" (e.g., 1). A binary segmented volume includes a 3D volume (e.g., a portion of the reconstructed volume) and one or more binary segmentation masks. The segmented volume within the 3D dataset may represent all or a portion of one or more organs (e.g., all of the brain of the patient) of a patient to be imaged.

The processor may identify the mask defining the segmented volume from a plurality of masks (e.g., corresponding to different regions of the patient to be imaged or a number of different patients to be imaged) stored within the memory. Alternatively or additionally, the processor may generate the mask based on user input or automatically. For example, the user may define, with one or more inputs such as a keyboard and a mouse, which voxels are to be included in the segmented volume.

In act 306, the processor identifies a position within the 3D dataset at or adjacent to a boundary defined by the mask generated in act 304. The processor may assign a surface to the binary mask. The surface separates positions that are considered to belong to the mask from positions that are outside the mask. The processor may assign the surface to the binary mask with, for example, smoothing operators. While the mask is a discrete structure, the smoothing operators extend the segmentation definition to arbitrary positions. The processor may use any number of smoothing operators including, for example, linear or cubic interpolation.

In one embodiment, the processor identifies a number of positions within the 3D dataset at or adjacent to the boundary defined by the mask. The method acts of method 300 (e.g., acts 302-314) are repeated for all of the identified positions. The method 300 may be performed for any number of positions.

In act 308, the processor identifies a plurality of voxels (e.g., a subset of voxels) within the 3D dataset. In a first example, the subset of voxels within the 3D dataset may be a subset of voxels of the plurality of voxels that are adjacent to the identified position within the 3D dataset. The subset of voxels may include any number of adjacent voxels. In one embodiment, the processor may identify the eight nearest voxels to the identified position within the 3D dataset.

Figure 4:
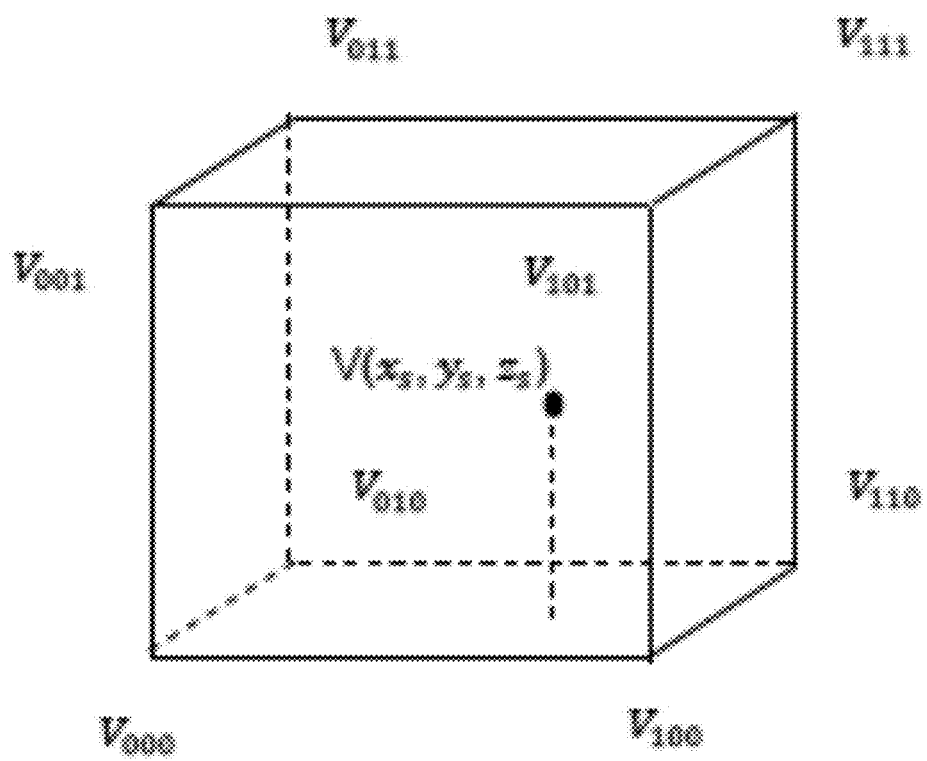
FIG. 4 illustrates an exemplary position and voxels adjacent to the identified position.

FIG. 4 illustrates an exemplary position V identified in act 306 and voxels $V_{ijk}$ adjacent to the identified position V. The identified position V lies within a cube that is spanned by the eight nearest voxels $V_{ijk}$, as provided in the first example. Positions of the eight voxels $V_{000}, \ldots V_{111}$ are positions $V_{ijk}(x_{ijk}, y_{ijk}, z_{ijk})$ that would be used for sampling at the identified position if a regular trilinear interpolation was being used. In other examples, the cube may be larger.

In the first example, three lambda values are defined:

$$\lambda_x = (x_s - x_{000})/(x_{111} - x_{000})$$

$$\lambda_y = (y_s - y_{000})/(y_{111} - y_{000})$$

$$\lambda_z = (z_s - z_{000})/(z_{111} - z_{000}) \quad (1)$$

From trilinear interpolation, eight functions are defined for the eight corresponding voxels $V_{ijk}$:

$$Q_{000}(\lambda_x, \lambda_y, \lambda_z) = (1-\lambda_z)(1-\lambda_y)(1-\lambda_x)$$

$$Q_{100}(\lambda_x, \lambda_y, \lambda_z) = (1-\lambda_z)(1-\lambda_y)\lambda_x$$

$$Q_{010}(\lambda_x, \lambda_y, \lambda_z) = (1-\lambda_z)\lambda_y(1-\lambda_x)$$

$$Q_{110}(\lambda_x, \lambda_y, \lambda_z) = (1-\lambda_z)\lambda_y\lambda_x$$

$$Q_{001}(\lambda_x, \lambda_y, \lambda_z) = \lambda_z(1-\lambda_y)(1-\lambda_x)$$

$$Q_{101}(\lambda_x, \lambda_y, \lambda_z) = \lambda_z(1-\lambda_y)\lambda_x$$

$$Q_{011}(\lambda_x, \lambda_y, \lambda_z) = \lambda_z\lambda_y(1-\lambda_x)$$

$$Q_{111}(\lambda_x, \lambda_y, \lambda_z) = \lambda_z\lambda_y\lambda_x \quad (2)$$

In a second example, the subset of voxels may include respective groups of voxels adjacent (e.g., nearest) to at least one of the voxels of the 3D dataset outside of the mask identified in act 304. For example, the subset of voxels may include the 26 voxels nearest to each of the voxels of the 3D dataset outside of the mask identified in act 304, respectively. In one embodiment, the eight voxels nearest to the identified position within the 3D dataset identified in the first example above may represent a second subset of voxels, and the subset of voxels identified in act 308 (e.g., a first subset of voxels) may be respective groups of voxels (e.g., 26 voxels) adjacent (e.g., nearest) to each voxel of the first subset of voxels (e.g., the eight voxels nearest to the identified position within the 3D dataset). In other words, in the second example, the eight voxels nearest to the identified position within the 3D dataset are still identified, and the 26 voxels nearest to each of the eight voxels nearest to the identified position within the 3D dataset are identified within act 308.

In the second example, the processor identifies the 26 voxel neighborhood for an identified voxel $V_{ijk}$. The 26 voxel neighborhood for the identified voxel $V_{ijk}$ includes all voxels $V_{(i+a)(j+b)(k+c)}$ where $$-1 \leq a \leq +1$$

$$-1 \leq b \leq +1$$

$$-1 \leq c \leq +1 \quad (3)$$

with the exception of the identified voxel $V_{ijk}$ itself.

In act 310, the processor determines, for each voxel of the subset of voxels, whether the respective voxel is inside or outside of the mask identified in act 304. In the first example, the processor determines, for each voxel of the eight voxels $V_{ijk}$ adjacent to the identified position, whether the voxel is inside or outside of the mask identified in act 304. The processor determines whether the eight voxels are inside or outside of the mask identified in act 304 using the surface assigned to the mask.

In the second example, the processor determines, for each voxel of the 26 voxel neighborhoods adjacent to the eight voxels $V_{ijk}$ adjacent to the identified position, respectively, whether the voxel is inside or outside of the mask identified in act 304. The processor determines whether voxels of the 26 voxel neighborhoods are inside or outside of the mask identified in act 304 using the surface assigned to the mask.

In act 312, the processor determines, for each voxel of the subset of voxels, a weight for the respective voxel based on the determining of whether the respective voxel is inside or outside of the identified mask of act 310. The processor may assign a weight for the respective voxel based on the determination of whether the respective voxel is inside or outside of the identified mask (act 310).

In the first example, if a position of the respective voxel (e.g., of the eight adjacent voxels) is outside of the identified mask, the processor may assign a weight of zero to the respective voxel. If the position of the respective voxel is inside the identified mask, the processor may assign a non-zero weight (e.g., a weight of one) to the respective voxel. $\omega_{ijk}$ is a scalar weight at the voxel position $V_{ijk}$ that satisfies the following constraints that depend on segmentation mask A (e.g., identified in act 304):

$$\omega_{ijk} > 0; \; V_{ijk} \in A$$

$$\omega_{ijk} = 0; \; V_{ijk} \notin A \quad (4)$$

In this example, the weight is zero if the voxel $V_{ijk}$ lies outside of the segmentation mask A, and the weight has a positive value (e.g., one) if the voxel $V_{ijk}$ is within the segmentation mask A. In other embodiments, different weights may be assigned to the voxels located outside of the mask and voxels located inside the mask, respectively.

In the second example, if a position of the respective voxel (e.g., of the neighborhoods of 26 adjacent voxels) is outside of the identified mask, the processor may assign a weight of zero to the respective voxel. If the position of the respective voxel is inside the identified mask, the processor may assign a non-zero weight (e.g., a weight of one) to the respective voxel. $\omega_{ijk}$ is a scalar weight at the voxel position $V_{ijk}$ that satisfies the following constraints that depend on segmentation mask A (e.g., identified in act 304):

$$\omega_{abc} > 0; \; V_{(i+a)(j+b)(k+c)} \in A$$

$$\omega_{abc} = 0; \; V_{(i+a)(j+b)(k+c)} \notin A \quad (5)$$

In act 314, the processor determines a voxel value for the identified position based on the determined weights and voxel values for the plurality of voxels, respectively. In the first example, with the weight definition provided in (3), a rational interpolation operator $P(\lambda_x, \lambda_y, \lambda_z)$ may be defined at position V:

$$P(\lambda_x, \lambda_y, \lambda_z) = \frac{\sum_{i=0}^{1}\sum_{j=0}^{1}\sum_{k=0}^{1} Q_{ijk}(\lambda_x, \lambda_y, \lambda_z)\omega_{ijk}P_{ijk}}{\sum_{i=0}^{1}\sum_{j=0}^{1}\sum_{k=0}^{1} Q_{ijk}(\lambda_x, \lambda_y, \lambda_z)\omega_{ijk}} \qquad (6)$$

At the boundary of the segmentation mask A, the number of nonzero weight $\omega_{ijk}$ values ranges from one to seven.

With the definitions that $$\lambda_{ijk}(\lambda_x, \lambda_y, \lambda_z) = \frac{Q_{ijk}(\lambda_x, \lambda_y, \lambda_z)\omega_{ijk}}{\sum_{i=0}^{1}\sum_{j=0}^{1}\sum_{k=0}^{1} Q_{ijk}(\lambda_x, \lambda_y, \lambda_z)\omega_{ijk}} \qquad (7)$$

equation (2) above may be reformulated as $$P(\lambda_x, \lambda_y, \lambda_z) = \sum_{i=0}^{1}\sum_{j=0}^{1}\sum_{k=0}^{1} \lambda_{ijk}(\lambda_x, \lambda_y, \lambda_z)P_{ijk} \qquad (8)$$

where the following equation is satisfied:

$$\Sigma_{i=0}^{1}\Sigma_{j=0}^{1}\Sigma_{k=0}^{1}\lambda_{ijk}(\lambda_x,\lambda_y,\lambda_z)=1 \qquad (9)$$

Since all weights $\omega_{ijk}$ are positive or zero, this provides that the interpolated boundary values will lie within the convex hull of the segmentation mask A. If an interpolation operator satisfies the convex-hull property, color bleeding is prevented, as satisfying the convex-hull property provides that the interpolated value lies between the minimum voxel value and the maximum voxel value that belong to the segmented tissue.

The weights $\omega_{ijk}$ may be used as degrees of freedom to reflect additional constraints at each voxel position (e.g., voxel or gradient magnitude values). Increasing the weight $\omega_{ijk}$ increases the influence of the voxel value $P_{ijk}$ within the interpolation computation and pulls iso-surfaces resulting from the interpolation towards the voxel $V_{ijk}$.

If all voxels $V_{ijk}$ are to be treated equal, the weights $\omega_{ijk}$ are chosen such that:

$$\omega_{ijk}=1; \; V_{ijk} \in A$$

$$\omega_{ijk}=0; \; V_{ijk} \notin A \qquad (10)$$

In this case, the non-boundary case where all eight weights $\omega_{ijk}$ corresponding to the eight voxels $V_{ijk}$ have a value of one, the following is satisfied:

$$\Sigma_{i=0}^{1}\Sigma_{j=0}^{1}\Sigma_{k=0}^{1}Q_{ijk}(\lambda_x,\lambda_y,\lambda_z)\omega_{ijk}=\Sigma_{i=0}^{1}\Sigma_{j=0}^{1}\Sigma_{k=0}^{1}Q_{ijk}(\lambda_x,\lambda_y,\lambda_z)=1 \qquad (11)$$

The interpolation then simplifies to a known trilinear interpolation scheme. Accordingly, with the first example, a $C^0$ continuous interpolation operation is provided by using a known trilinear interpolation for non-boundary cases and using the rational trilinear interpolation operator of equation (8) above with uniform weights $\omega_{ijk}$ at the boundary.

The rational interpolation operator of the first example is not only restricted to boundary cases. The rational interpolation operator may also be defined for positions where all voxels lie within the segmentation mask A and none of the weights $\omega_{ijk}$ are zero. The rational interpolation operator, which is defined at the boundary and the interior of the segmentation mask A, is $C^0$ continuous and provides both color bleeding prevention and continuity. The rational trilinear interpolation provided by the first example allows for interpolation of a subset of the eight voxels that would normally be used for a trilinear interpolation.

Due to the limited numerical precision of floating point representations, when realized with a computer program, the interpolated numerical value (e.g., $P_{ijk}$) may lie outside of the convex hull. If all interpolated boundary values, even in a numerical realization, are to be within the convex hull, further acts may be performed. In one embodiment, the processor determines a maximum of the voxel values and a minimum of the voxel values (e.g., within the 3D dataset). The processor compares the determined voxel value to the maximum voxel value and the minimum voxel value. The processor adjusts the determined voxel value to be equal to the maximum voxel value when the determined voxel value is greater than the maximum voxel value. The processor adjusts the determined voxel value to be equal to the minimum voxel value when the determined voxel value is less than the minimum voxel value. In other words, $$\min(P_{ijk}; \; V_{ijk} \in A)$$

$$\max(P_{ijk}; \; V_{ijk} \in A) \qquad (12)$$

When using rational expressions, instances when the denominator is equal to zero or the numerator and the denominator are equal to zero may be encountered. This may be addressed in the method 300 in that the processor may detect when the denominator becomes close to zero (e.g., using a threshold), and the denominator may be calculated in a different way than above (e.g., special case handling) to provide better resolution. In another example, this numerical problem may be prevented by not allowing the denominator to be equal to zero. According to equations (2) and (7) above, the denominator becomes zero when $\lambda_{xyz}$ or $(1-\lambda_{xyz})$ becomes zero. The denominator of equation (7), for example, may thus be prevented from being equal to zero by clamping $\lambda_{xyz}$ or $(1-\lambda_{xyz})$ to a predetermined non-zero value (e.g., $\varepsilon$).

The processor may determine an interpolated numerical value $P_{ijk}$ for the identified position V using any number of other types of interpolations. For example, the processor may determine the interpolated numerical value $P_{ijk}$ for the identified position V with a tricubic interpolation. The first example, using the rational trilinear interpolation operator, described above may be extended to the rational tricubic interpolation. The rational trilinear interpolation operator described above, with reference to the first example, uses linear Bezier basis functions to construct a boundary interpolation operator for segmented volumes. Instead of using such Bezier basis functions, analogous operators for Bezier polynomials of higher degree may be defined. For example, $Q_{ijk}^3(\lambda_x,\lambda_y,\lambda_z)$ may be 64 tricubic Bezier basis functions for the 3D case. With this definition, the rational trilinear interpolation operator for segmented volumes may be extended to a rational tricubic operator:

$$P(\lambda_x, \lambda_y, \lambda_z) = \frac{\sum_{i=0}^{3}\sum_{j=0}^{3}\sum_{k=0}^{3} Q_{ijk}^3(\lambda_x, \lambda_y, \lambda_z)\omega_{ijk}B_{ijk}}{\sum_{i=0}^{3}\sum_{j=0}^{3}\sum_{k=0}^{3} Q_{ijk}^3(\lambda_x, \lambda_y, \lambda_z)\omega_{ijk}} \qquad (13)$$

The weights $\omega_{ijk}$ again depend on the segmentation mask (see equations 5 and 10). Values $B_{ijk}$ may not be voxel values $P_{ijk}$, but may be values derived from the voxel values $P_{ijk}$ to satisfy additional constraints (e.g., interpolation properties, approximation properties, or continuity properties). The theory of Non-Uniform Rational B-Splines (NURBS) may provide guidance as to how the weights $\omega_{ijk}$ and the values $B_{ijk}$ are to be defined to achieve a predefined continuity. This rational tricubic operator may be defined for both boundary cases and non-boundary cases with the segmented volume.

In another example, the processor may determine the interpolated numerical value $P_{ijk}$ for the identified position V with a quadrilinear interpolation. When a sequence of multiple 3D volumes are to be rendered as a 4D movie, the quadrilinear interpolation may be used to generate intermediate volumes. Each 3D volume may have a corresponding binary segmentation mask. The trilinear interpolation operator may be extended to the 4D example by defining:

$$P(\lambda_x, \lambda_y, \lambda_z, \lambda_w) = \frac{\sum_{i=0}^{1} \sum_{j=0}^{1} \sum_{k=0}^{1} \sum_{w=0}^{1} Q_{ijkw}(\lambda_x, \lambda_y, \lambda_z, \lambda_w) \omega_{ijkw} P_{ijkw}}{\sum_{i=0}^{1} \sum_{j=0}^{1} \sum_{k=0}^{1} \sum_{w=0}^{1} Q_{ijkw}(\lambda_x, \lambda_y, \lambda_z, \lambda_w) \omega_{ijkw}} \quad (14)$$

$Q_{ijkw}(\lambda_x, \lambda_y, \lambda_z)$ are the sixteen basis functions known from regular quadrilinear interpolation. The binary segmentation mask A is 4D, and the weights $\omega_{ijkw}$ are defined as $\omega_{ijkw} > 0;\ V_{ijkw} \in A$ $\omega_{ijkw} = 0;\ V_{ijkw} \notin A$ \quad (15)

In other embodiments, the interpolation operator may be extended to higher dimensions analogously.

In the second example, the processor determines an averaging operator. The averaging operator may replace a voxel value $P_{ijk}$ with a segmentation mask aware average $\hat{P}_{ijk}$:

$$\hat{P}_{ijk} = \frac{\sum_{a=-1}^{1} \sum_{b=-1}^{1} \sum_{c=-1}^{1} \omega_{abc} P_{(i+a)(j+b)(k+c)}}{\sum_{a=-1}^{1} \sum_{b=-1}^{1} \sum_{c=-1}^{1} \omega_{abc}} \quad (16)$$

The segmentation mask aware average is a weighted average of the values of, for example, the portion of the 26 adjacent voxels that are within the binary mask A. The segmentation aware average uses the weights $\omega_{ijk}$ determined in act 312. The portion of voxels may include any number of voxels of the 26 adjacent voxels (e.g., zero to 26 voxels). The processor defines a new voxel value $\hat{P}_{ijk}$ for each voxel position $V_{ijk}$, which is defined as:

$\hat{P}_{ijk} = P_{ijk};\ V_{ijk} \in A$ \quad (17)

$$\hat{P}_{ijk} = \frac{\sum_{a=-1}^{1} \sum_{b=-1}^{1} \sum_{c=-1}^{1} \omega_{abc} P_{(i+a)(j+b)(k+c)}}{\sum_{a=-1}^{1} \sum_{b=-1}^{1} \sum_{c=-1}^{1} \omega_{abc}};\ V_{ijk} \notin A$$

In other words, the voxel value $P_{ijk}$ is unchanged if the voxel position $V_{ijk}$ is within the binary mask A; if the voxel position $V_{ijk}$ is outside of the binary mask, the voxel value $P_{ijk}$ becomes the segmentation mask aware average calculated with equation (16). Once the new voxel values $\hat{P}_{ijk}$ have been determined, the processor computes the interpolation at the sampling position V with a trilinear interpolation using, for example, the eight adjacent (e.g., as described above in the first example) new voxel values $\hat{P}_{ijk}$.

Since the weighted average operator (equation (16)) produces values that lie within the convex hull of the values that lie within the mask A (e.g., with weights of zero assigned to voxels outside of the mask A), all voxel values $\hat{P}_{ijk}$ satisfy the convex hull property. Since trilinear interpolation operators preserve the convex hull property, the second example also preserves the convex hull property.

In one embodiment, the processor computes the new voxel values $\hat{P}_{ijk}$ in a different way. The processor also performs boundary averaging within the segmentation mask, and every voxel $V_{ijk}$ is computed according to:

$$\hat{P}_{ijk} = \frac{\sum_{a=-1}^{1} \sum_{b=-1}^{1} \sum_{c=-1}^{1} \omega_{abc} P_{(i+a)(j+b)(k+c)}}{\sum_{a=-1}^{1} \sum_{b=-1}^{1} \sum_{c=-1}^{1} \omega_{abc}} \quad (18)$$

In other words, the voxel value $P_{ijk}$ becomes the segmentation mask aware average calculated with equation (16) both if the voxel position $V_{ijk}$ is outside of the binary mask and if the voxel position $V_{ijk}$ is inside of the binary mask. Again, once the new voxel values $\hat{P}_{ijk}$ have been determined, the processor computes the interpolation at the sampling position V with a trilinear interpolation using, for example, the eight adjacent (e.g., as described above in the first example) new voxel values $\hat{P}_{ijk}$.

Similarly to the first example, the second example may be extended to a 4D scenario. The binary segmentation mask A is 4D. The weights $\omega_{ijkw}$ are defined as $\omega_{abcd} > 0;\ V_{(i+a)(j+b)(k+c)(w+d)} \in A$ $\omega_{abcd} = 0;\ V_{(i+a)(j+b)(k+c)(w+d)} \notin A$ \quad (19), and the boundary averaging operator is thus defined with:

$$\hat{P}_{ijkw} = \frac{\sum_{a=0}^{1} \sum_{b=0}^{1} \sum_{c=0}^{1} \sum_{d=0}^{1} \omega_{abcd} P_{(i+a)(j+b)(k+c)(w+d)}}{\sum_{a=0}^{1} \sum_{b=0}^{1} \sum_{c=0}^{1} \sum_{d=0}^{1} \omega_{abcd}} \quad (20)$$

Accordingly, the averaging may be applied only outside of the mask, or outside of the mask and inside the mask. With this definition, the interpolation of the sampling position V may be performed with a quadrilinear interpolation of the new voxel values $\hat{P}_{ijk}$.

In one embodiment (e.g., a third example), the first example and the second example may be combined. Using the new voxel values $\hat{P}_{ijk}$ calculated in the second example, the rational interpolation scheme of the first example may be applied $$P(\lambda_x, \lambda_y, \lambda_z) = \frac{\sum_{i=0}^{1}\sum_{j=0}^{1}\sum_{k=0}^{1} Q_{ijk}(\lambda_x, \lambda_y, \lambda_z)\omega_{ijk}\hat{P}_{ijk}}{\sum_{i=0}^{1}\sum_{j=0}^{1}\sum_{k=0}^{1} Q_{ijk}(\lambda_x, \lambda_y, \lambda_z)\omega_{ijk}} \quad (21)$$

where the weights are defined as $\omega_{ijk}=1; V_{ijk} \in A$ $\omega_{ijk}=\omega; V_{ijk} \notin A$ (22)

The scalar blending parameter ω is greater than or equal to zero and is less than or equal to one. In the case where the scalar blending parameter ω is equal to one, a regular trilinear interpolation of the new voxel values $\hat{P}_{ijk}$ is performed (e.g., the third example simplifies to the second example). In the case where the scalar blending parameter ω is equal to zero, the values outside of the mask are not used, and the values inside of the mask are equal to $P_{ijk}$ (e.g., the third example simplifies to the first example). If smoothing is applied within the mask (see the second example), a variant of the first example, where the voxel values that are within the mask have been smoothed before applying the rational interpolation, is performed. Other scenarios (e.g., with a scalar blending parameter ω between zero and one) provide different blending between the first example and the second example. A user may control the value of the scalar blending parameter ω with a portion of a GUI. For example, the GUI may include a slider controlled by a user with an input device such as, for example, a mouse, to change the scalar blending parameter.

In one embodiment, the third example, like the first example and the second example, may be extended to a quadrilinear boundary interpolation. Since the third example is a combination of the first example and the second example, the third example may also be extended to the quadrilinear case for the 4D scenario using the quadrilinear operators defined for the first example and the second example.

In act 315, the processor determines whether an additional voxel value is to be determined for an additional boundary position. If the processor determines that an additional voxel value is to be determined for an additional boundary position, the method 300 returns to act 306, and acts 306-314 are repeated. If the processor determines that an additional voxel value is not to be determined for an additional boundary position, the method moves to act 316.

The processor may generate an image based on the voxel value determined in act 314. The processor may generate the image using a transfer function for the voxels within the mask and for any or all of the interpolated values calculated with the execution of the method 300. The generated image may be displayed on a display in communication with the processor and/or stored in a memory in communication with the processor.

Figure 5:
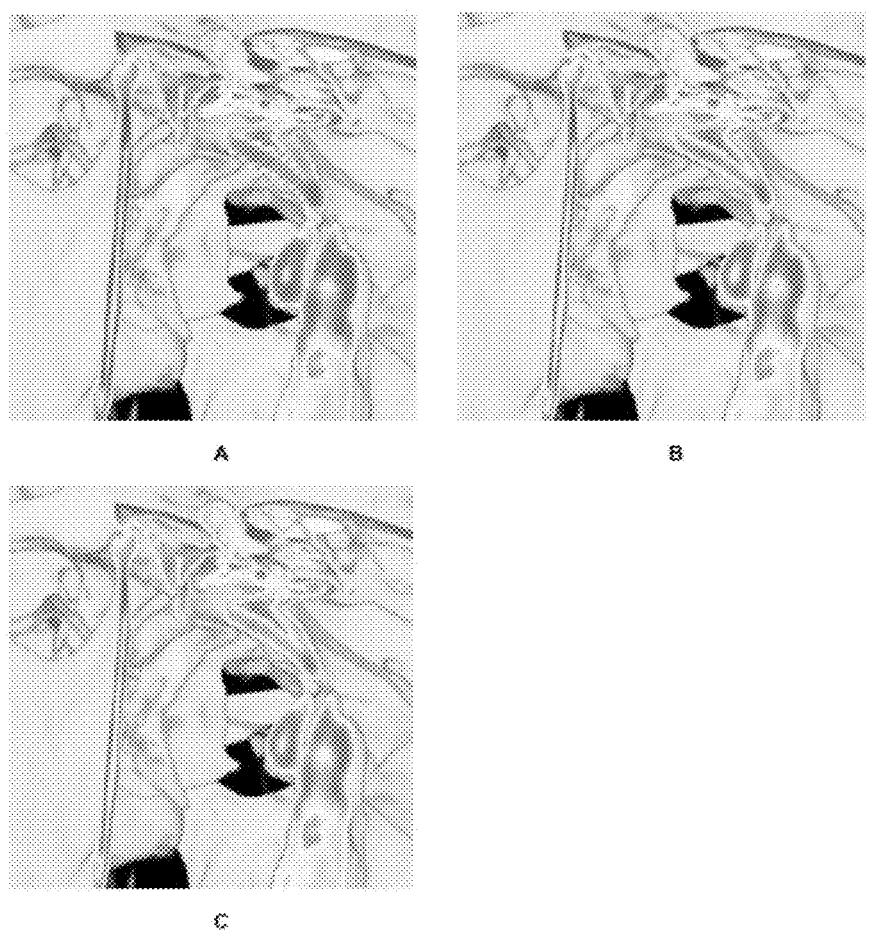
FIG. 5 shows first exemplary images generated with different embodiments of the method.
Figure 6:
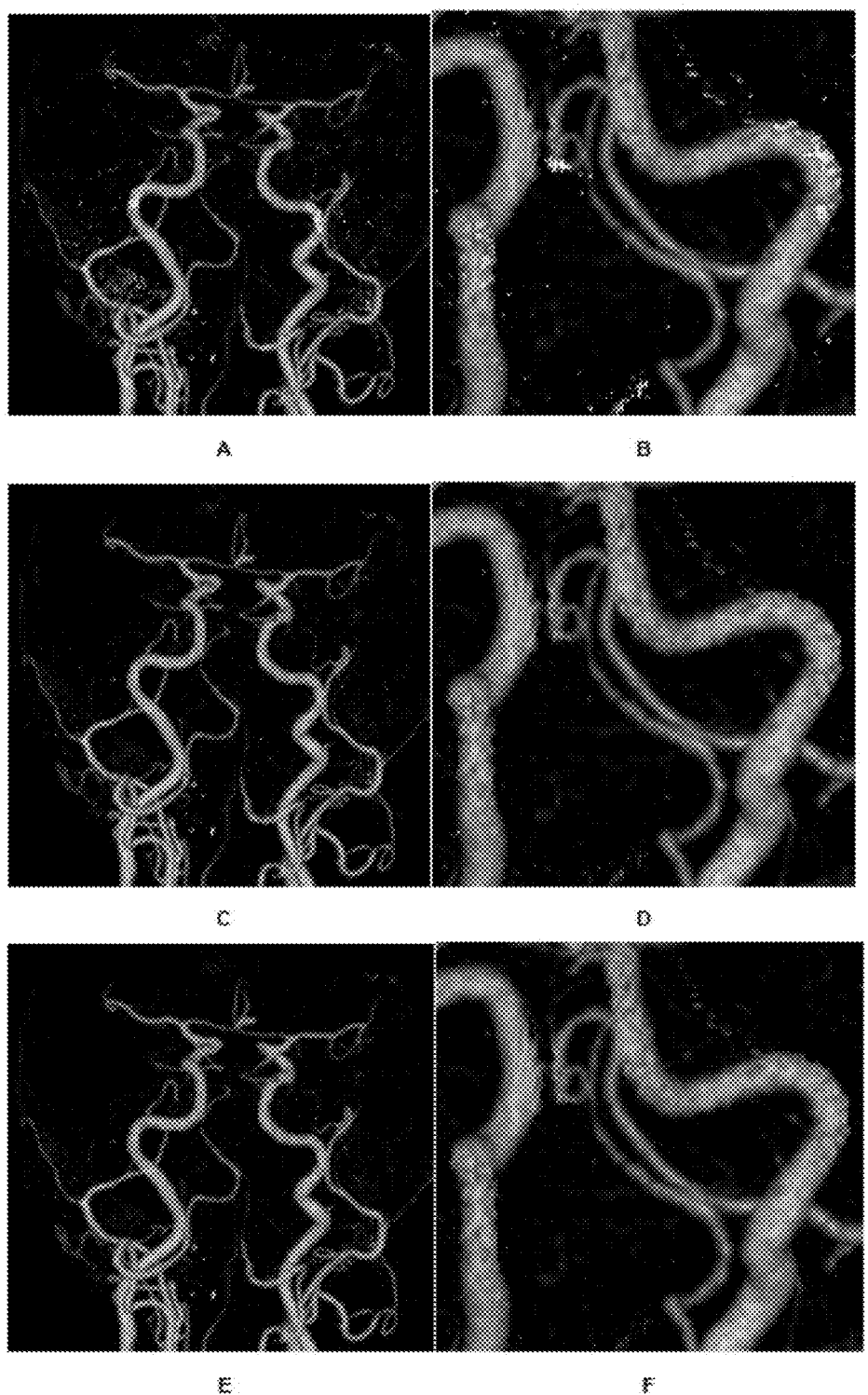
FIG. 6 shows second exemplary images generated with different embodiments of the method.

FIGS. 5 and 6 are images generated with the first example and the second example. In FIG. 5, an unshaded volume rendering technique (VRT) is shown with a segmentation mask that removes some parts of a volume. In image A, nearest neighbor interpolation was used for boundary cases to prevent color bleeding, and otherwise, trilinear interpolation was used. The discontinuous interpolation operator leads to discontinuous color values at the boundary. The discontinuous color values become visible block artifacts. In image B, the boundary positions were computed with the first example using uniform weights. Image C was generated using the second example. As illustrated with image B and image C of FIG. 5, the first example and the second example described above provide continuous color distributions near the boundary of the mask that fit well with a trilinear interpolation that is used for non-boundary positions.

In FIG. 6, a shaded VRT is shown where all parts of a volume except vessels have been removed using segmentation masks. Images A and B show resultant images when color bleeding prevention is not active. White artifacts are visible throughout images A and B. Images C and D show results when the first example described above is activated to prevent color bleeding, and images E and F show results when the second example described above is activated to prevent color bleeding. As illustrated with FIG. 6, the first example and the second example described above greatly reduce the white artifacts of images A and B.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method of color bleeding reduction or prevention when volume rendering a three-dimensional (3D) dataset, the 3D dataset comprising a plurality of voxels, the method comprising:
   identifying, by a processor, a mask that defines a segmented volume within the 3D dataset;
   identifying, by the processor, a position within the 3D dataset at or adjacent to a boundary defined by the mask;
   identifying, by the processor, a subset of voxels of the plurality of voxels within the 3D dataset;
   determining, for each voxel of the subset of voxels, by the processor, whether the respective voxel is inside or outside of the identified mask;
   determining, for each voxel of the subset of voxels, by the processor, a weight for the respective voxel based on the determining of whether the respective voxel is inside or outside of the identified mask; and
   determining, by the processor, a voxel value for the identified position based on the determined weights and voxel values for the subset of voxels, respectively.

2. The method of claim 1, wherein identifying the subset of voxels within the 3D dataset comprises identifying eight nearest voxels to the identified position within the 3D dataset.

3. The method of claim 2, wherein determining the voxel value for the identified position comprises determining, by the processor, the voxel value with a rational interpolation operator including the determined weights and the voxel values.

4. The method of claim 1, further comprising identifying a voxel of the plurality of voxels,
   wherein identifying the subset of voxels within the 3D dataset comprises identifying a group of voxels adjacent to the identified voxel within the 3D dataset.

5. The method of claim 4, wherein the group of adjacent voxels comprises 26 voxels adjacent to the identified voxel.

6. The method of claim 4, further comprising:
   determining an average voxel value for the group of adjacent voxels based on the determined weights and the voxel values for the subset of voxels, respectively; and adjusting, for the identified voxel, the voxel value to be equal to the determined average voxel value.

7. The method of claim 6, wherein the identified voxel is a voxel outside of the identified mask, and
wherein the method further comprises repeating, for all other voxels of the plurality of voxels outside of the identified mask, the identifying of a voxel that is outside of the identified mask, the identifying of the subset of voxels, the determining of the average voxel value, and the adjusting.

8. The method of claim 7, further comprising repeating, for all voxels of the plurality of voxels inside the identified mask, the identifying of a voxel that is outside of the identified mask, the identifying of the subset of voxels, the determining of the average voxel value, and the adjusting.

9. The method of claim 6, wherein the subset of voxels is a first subset of voxels,
wherein the method further comprises identifying a second subset of voxels of the plurality of voxels within the 3D dataset, the second subset of voxels comprising a group of voxels adjacent to the identified position,
wherein the identified voxel is a voxel of the second subset of voxels, and
wherein the method further comprises repeating, for all other voxels of the second subset of voxels, the identifying of a voxel, the identifying of the subset of voxels, the determining of the average voxel value, and the adjusting.

10. The method of claim 9, wherein determining the voxel value for the identified position comprises determining, by the processor, the voxel value with a rational interpolation operator including the adjusted voxel values.

11. The method of claim 9, wherein the weights are first weights,
wherein the method further comprises:
determining, for each voxel of the second subset of voxels, whether the respective voxel is inside or outside of the identified mask; and
determining, for each voxel of the second subset of voxels, a second weight for the respective voxel based on the determining of whether the respective voxel is inside or outside of the identified mask, and
wherein determining the voxel value for the identified position comprises determining, by the processor, the voxel value with a rational interpolation operator as a function of the adjusted voxel values and the second weights.

12. The method of claim 11, wherein determining the second weight for the respective voxel based on the determining of whether the respective voxel is inside or outside of the identified mask comprises setting the second weight for the respective voxel to be one when the respective voxel is inside the identified mask and setting the second weight for the respective voxel to be equal to a changeable parameter when the respective voxel is outside of the identified mask.

13. The method of claim 1, wherein determining the weight for the respective voxel based on the determining of whether the respective voxel is inside or outside of the identified mask comprises setting the weight for the respective voxel to be one when the respective voxel is inside the identified mask and setting the weight for the respective voxel to be zero when the respective voxel is outside the identified mask.

14. The method of claim 1, wherein determining the voxel value comprises determining the voxel value using a trilinear interpolation, a tricubic interpolation, or a quadrilinear interpolation, the quadrilinear interpolation being for a plurality of 3D datasets, the plurality of 3D datasets including the 3D dataset.

15. The method of claim 1, wherein, for each position of a plurality of additional positions within the 3D dataset at or adjacent to the boundary defined by the mask, the method further comprises:
repeating the identifying of the subset of voxels, the determining of whether the voxels are inside or outside of the identified mask, the determining of the weights for the voxels, respectively, and the determining of the voxel value for the position.

16. A system for volume rendering a three-dimensional dataset, the system comprising:
a memory configured to store a three-dimensional (3D) dataset, the 3D dataset including a plurality of voxels;
a processor in communication with the memory, the processor configured to:
identify a mask that defines a segmented volume within the 3D dataset;
identify a position within the 3D dataset at or adjacent to a boundary defined by the mask;
identify a subset of voxels of the plurality of voxels within the 3D dataset;
determine, for each voxel of the subset of voxels, whether the respective voxel is inside or outside of the identified mask;
determine, for each voxel of the subset of voxels, a weight for the respective voxel based on the determination of whether the respective voxel is inside or outside of the identified mask, the weight for the respective voxel being zero when the respective voxel is outside of the identified mask;
determine a voxel value for the identified position based on the determined weights and voxel values for the subset of voxels, respectively; and
generate an image based on the determined voxel value for the identified position.

17. The system of claim 16, wherein the processor is further configured to:
identify a voxel of the plurality of voxels, wherein the subset of voxels comprises 26 voxels of the plurality of voxels nearest to the identified voxel;
determine an average voxel value for the subset of voxels based on the determined weights and the voxel values for the subset of voxels, respectively;
adjust, for the identified voxel, the respective voxel value to be equal to the determined average voxel value; and
repeat, at least for all voxels of the plurality of voxels outside of the identified mask, the identification of the voxel, the determination of the average voxel value for the subset of voxels, and the adjustment of the respective voxel value.

18. The system of claim 17, wherein the determination of the voxel value for the identified position comprises a determination, using a trilinear interpolation, a tricubic interpolation, or a quadrilinear interpolation, of the voxel value based on adjusted voxel values for a group of voxels adjacent to the identified position, respectively.

19. The system of claim 16, wherein the identification of the subset of voxels within the 3D dataset comprises identification of eight voxels of the plurality of voxels nearest to the identified position within the 3D dataset, and
wherein the determination of the voxel value for the identified position comprises a determination of the voxel value with a rational interpolation operator including the determined weights and the voxel values for the subset of voxels.

20. In a non-transitory computer-readable storage medium storing instructions executable by one or more processors to volume render a three-dimensional (3D) dataset, the instructions comprising:
identifying, by the one or more processors, a mask that defines a segmented volume within the 3D dataset;
identifying, by the one or more processors, a position within the 3D dataset at or adjacent to a boundary defined by the mask; and
identifying, by the one or more processors, a subset of voxels within the 3D dataset;
determining, for each voxel of the subset of voxels, by the one or more processors, whether the respective voxel is inside or outside of the identified mask;
determining, for each voxel of the subset of voxels, by the one or more processors, a weight for the respective voxel based on the determining of whether the respective voxel is inside or outside of the identified mask; and
determining, by the one or more processors, a voxel value for the identified position based on the determined weights and voxel values for the subset of voxels, respectively.

21. A method of reducing or preventing color bleeding when volume rendering a three-dimensional (3D) dataset, the 3D dataset comprising a plurality of voxels, the method comprising:
identifying, by a processor, a mask that defines a segmented volume within the 3D dataset;
identifying, by the processor, a plurality of positions within the 3D dataset at or adjacent to a boundary defined by the mask;
for each position of the plurality of positions:
identifying, by the processor, a first subset of voxels of the plurality of voxels within the 3D dataset, the first subset of voxels being adjacent to the identified position;
identifying, for each voxel of the first subset of voxels, by the processor, a second subset of voxels of the plurality of voxels within the 3D dataset, the second subset of voxels being adjacent to the respective voxel;
determining, for each voxel of the second subset of voxels, by the processor, whether the respective voxel is inside or outside of the identified mask;
determining, for each voxel of the first subset of voxels, by the processor, a first weight for the respective voxel based on the determining of whether the respective voxel is inside or outside of the identified mask;
determining, for each voxel of the second subsets of voxels, by the processor, a second weight for the respective voxel based on the determining of whether the respective voxel is inside or outside of the identified mask;
determining, for each voxel of the first subset of voxels, an average voxel value for the group of adjacent voxels based on the determined weights and the voxel values for the subset of voxels, respectively;
adjusting, for each voxel of the first subset of voxels, the voxel value to be equal to the determined average voxel value; and
determining, by the processor, a voxel value for the identified position with a rational interpolation operator as a function of the determined first weights, the determined second weights, and adjusted voxel values for the first subset of voxels.

* * * * *